US011837944B2

United States Patent
Kim (10) Patent No.: US 11,837,944 B2
(45) Date of Patent: Dec. 5, 2023

(54) CAR MOTOR COOLING APPARATUS

(71) Applicant: HYUNDAI MOBIS CO., LTD., Seoul (KR)

(72) Inventor: Nam Seok Kim, Pohang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 397 days.

(21) Appl. No.: 16/861,499

(22) Filed: Apr. 29, 2020

(65) Prior Publication Data

US 2021/0175779 A1   Jun. 10, 2021

(30) Foreign Application Priority Data

Dec. 9, 2019   (KR) .................. 10-2019-0163046

(51) Int. Cl.
| | |
|---|---|
| *H02K 9/19* | (2006.01) |
| *H02K 7/00* | (2006.01) |
| *F01P 3/20* | (2006.01) |
| *F01P 9/02* | (2006.01) |
| *F01P 3/00* | (2006.01) |

(52) U.S. Cl.
CPC .................. *H02K 9/19* (2013.01); *F01P 3/20* (2013.01); *F01P 9/02* (2013.01); *H02K 7/006* (2013.01); *F01P 2003/006* (2013.01)

(58) Field of Classification Search
CPC ............ H02K 9/197; H02K 9/19; H02K 9/20; H02K 7/006; H02K 5/10; H02K 5/203; H02K 5/20; F01P 3/20; F01P 9/02; F01P 2003/006; B60K 11/02; B60K 1/00; B60K 2001/006; H05K 7/20872; B60Y 2306/03
See application file for complete search history.

(56) References Cited

U.S. PATENT DOCUMENTS

| | | | | |
|---|---|---|---|---|
| 10,272,767 | B1* | 4/2019 | Tang | .................. H02K 9/19 |
| 10,532,650 | B2* | 1/2020 | Lee | .................. H02K 9/19 |
| 10,879,770 | B2* | 12/2020 | Sakurada | .............. H02K 9/193 |
| 2014/0009015 | A1 | 1/2014 | Hossain et al. | |
| 2017/0324305 | A1* | 11/2017 | Chamberlin | ............. H02K 9/19 |
| 2018/0115219 | A1 | 4/2018 | Moon et al. | |

(Continued)

FOREIGN PATENT DOCUMENTS

| | | | | |
|---|---|---|---|---|
| CN | 203645474 U | 6/2014 | | |
| CN | 104518613 A | 4/2015 | | |
| CN | 105888813 A | * | 8/2016 | ............... F01P 3/18 |

(Continued)

*Primary Examiner* — Grant Moubry
(74) *Attorney, Agent, or Firm* — NSIP Law (57) ABSTRACT

The present invention is proposed to simplify a structural complexity of a conventional oil cooling method for a car motor, reduce a material cost, and also achieve improved cooling performance, in which a cooling liquid, which is provided through a cooling pipe in a conventional case, is sprayed onto a heating portion in a motor through a reservoir tank and a nozzle which are attached to a motor housing through a direct cooling method. A reservoir space is integrally formed with the motor housing or is formed to be separate from the motor housing, a pressure of the cooling liquid is uniformly maintained and damped, and the cooling liquid introduced into the reservoir tank through a flow path formed without a cooling pipe is directly sprayed onto the heating portion to cool the heating portion such as a stator core or a coil.

21 Claims, 8 Drawing Sheets

(56) References Cited

U.S. PATENT DOCUMENTS

2020/0014283 A1\* 1/2020 Payne .................... H02K 9/19

FOREIGN PATENT DOCUMENTS

| JP | 2012-157098 A | 8/2012 |
| JP | 2018-537933 A | 12/2018 |
| JP | 2019-504603 A | 2/2019 |
| JP | 2019-140786 A | 8/2019 |
| KR | 10-2018-0066416 A | 6/2018 |
| KR | 10-2019-0041854 A | 4/2019 |

\* cited by examiner

CAR MOTOR COOLING APPARATUS

CROSS-REFERENCE TO RELATED APPLICATION

This application claims priority to and the benefit of Korean Patent Application No. 10-2019-0163046, filed on Dec. 9, 2019, the disclosure of which is incorporated herein by reference in its entirety.

BACKGROUND

1. Field of the Invention

The present invention relates to a car motor cooling apparatus using a cooling liquid.

2. Discussion of Related Art

A motor used for an eco-friendly car (particularly, a driving motor) converts electric energy of battery or hydrogen tank (or, fuel cell stack) into kinetic energy to drive a car. In addition, various motors for various uses are used in a car. When in motor's energy conversion, heat is generated from a stator core or a coil of the motor and so the heat should be cooled. Power density and a size of the motor are determined according to cooling efficiency.

A conventional method of cooling the heat generated by a motor includes an indirect cooling method using cooling water and a proximity cooling method using cooling oil. The former indirect cooling method uses thermal conductivity of a temperature of the cooling water, and the latter is a method of cooling by oiling around a heating portion through a hole formed in a cooling pipe.

In the case of the cooling method using cooling water, a stator core is press-fitted into a motor housing and the cooling water is provided in a water passage in the housing. Due to heat conduction of the cooling water passing through the water passage of the housing, the stator core, that is, a heating portion, is cooled, and accordingly, a coil is cooled due to heat conduction from the core.

In the case of that method, however, since cooling is performed due to indirect heat conduction, cooling efficiency is not satisfactory and power density of a motor is decreased, and thus a capacity of a motor must be larger.

On the other hand, in the case of the cooling method using cooling oil, a stator core is assembled to a motor housing by using a bolt, and cooling oil is provided to a heating portion through a cooling oil entrance from a cooling pipe. Several holes are formed in the cooling pipe, and cooling is performed by spraying oil onto a coil, that is, a heating portion, and around a core.

However, a material cost for this method is high due to a material cost of the cooling pipe and a machining cost of the holes. In addition, since there is no choice but to form the holes through which the oil is sprayed to have a simple hole shape due to machining, the holes cannot be machined to have other shapes instead of the hole shape. In addition, since the holes have the simple hole shape, when the cooling oil is sprayed, a phenomenon in which the oil flows along a structure due to a spray pressure may occur such that a cooling effect is decreased because the oil does not flow to a cooling target portion. In addition, structurally, since a stator core is assembled with the housing using a bolt (since the cooling pipe should be positioned between the housing and the core, the core cannot be directly press-fitted into the housing. Accordingly, in order to fix the core to the housing, a flange is formed around the core and the flange is assembled with the housing using a bolt), heat conduction of an external temperature is not sufficiently performed between the housing and the core so that cooling efficiency through the heat conduction is decreased.

SUMMARY OF THE INVENTION

The present invention is directed to simplifying structural complexity of a conventional oil cooling method for a car motor so as to reduce a material cost and achieve improved cooling performance.

The technical objectives of the present invention are not limited to the above, and other objectives may become apparent to those of ordinary skill in the art based on the following description.

According to an aspect of the present invention, a cooling liquid (cooling water or cooling oil), which is provided through a cooling pipe in a conventional case, is sprayed onto a heating portion in a motor through a reservoir tank and a nozzle which are attached to a motor housing through a direct cooling method.

A reservoir space is integrally formed with the motor housing, or is formed to be separate from the motor housing, a pressure of the cooling liquid is uniformly maintained and damped, the cooling liquid introduced into the reservoir tank through a flow path formed without a cooling pipe is directly sprayed onto the heating portion to cool the heating portion, such as a stator core or a coil.

In addition, cooling efficiency can be improved by intelligently controlling recirculation, a spray shape, and a spray time of the cooling liquid.

The above described spirit of the present invention will be clear through specific embodiments which will be described below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood through embodiments described in detail with reference to the accompanying drawings. However, the present invention is not limited to the embodiments to be disclosed below but may be implemented in various different forms. The embodiments are provided in order to fully explain the present invention and fully explain the scope of the present invention for those skilled in the art. The scope of the present invention is defined by the appended claims. Meanwhile, the terms used herein are provided only to describe the embodiments of the present invention and not for purposes of limitation. Unless the context clearly indicates otherwise, the singular forms include the plural forms. It will be understood that the terms "comprise" or "comprising," when used herein, specify some stated components, steps, operations and/or elements but do not preclude the presence or addition of one or more other components, steps, operations and/or elements.

Hereinafter, the exemplary embodiments of the present invention will be described in detail with reference to the accompanying drawings. When reference numerals are assigned to elements of each drawing and the same elements are illustrated in different drawings, the same reference numerals are assigned to the same elements whenever possible. In descriptions of the present invention, when detailed descriptions of related known configurations or functions are deemed to unnecessarily obscure the gist of the present invention, they will be omitted.

Figure 1:
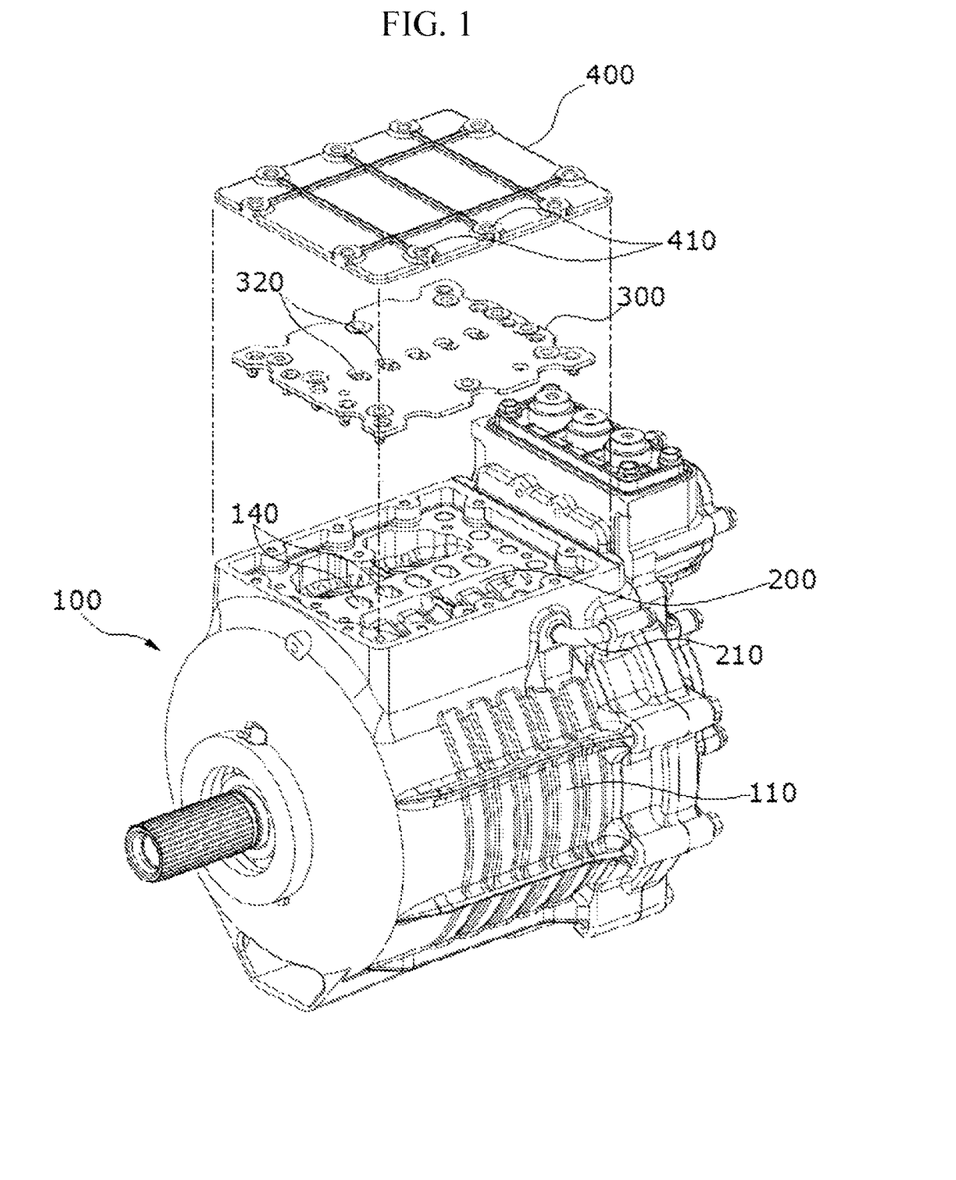
FIG. 1 is a perspective view illustrating a driving motor (100) according to an exemplary embodiment of the present invention.
Figure 2:
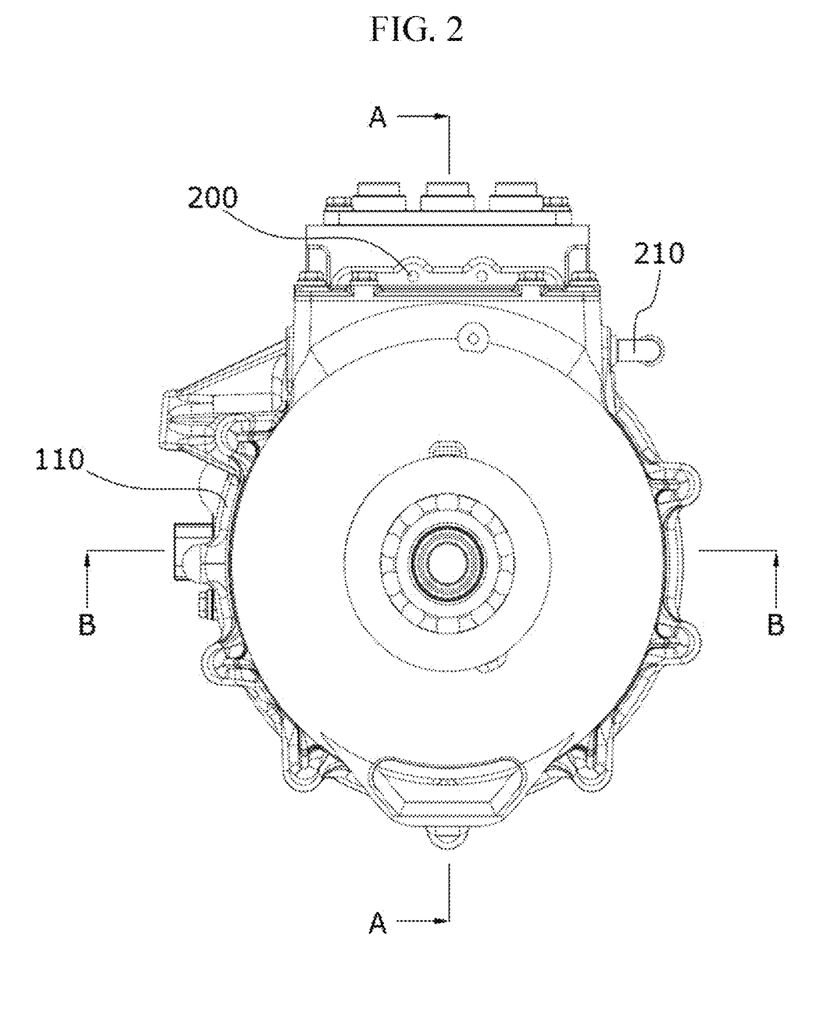
FIG. 2 is a front view of FIG. 1.
Figure 3:
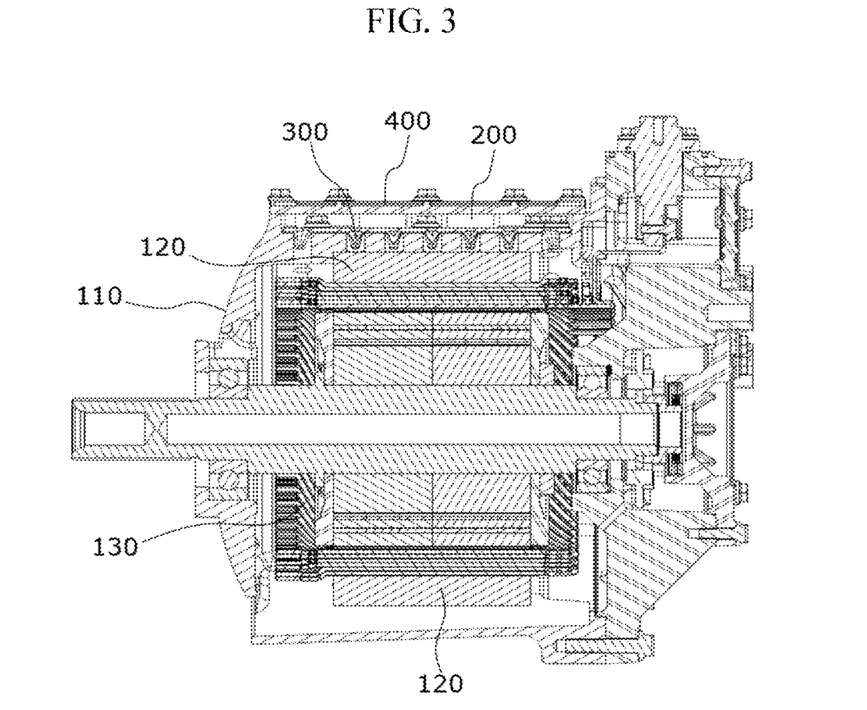
FIG. 3 is a cross-sectional view taken along line A-A of FIG. 2.
Figure 4:
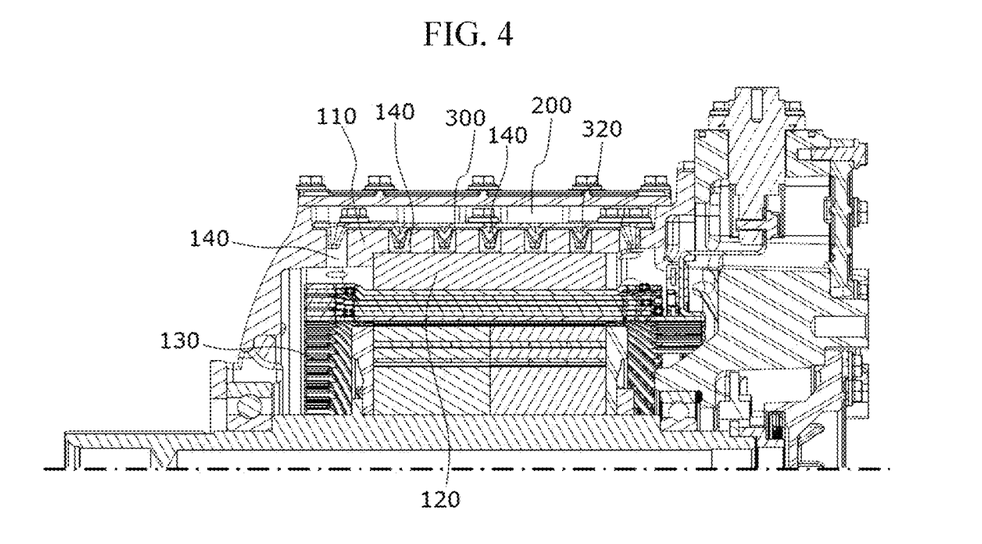
FIG. 4 is an enlarged view illustrating features of FIG. 3.

FIG. 1 is a perspective view illustrating a driving motor 100 according to an exemplary embodiment of the present invention, FIG. 2 is a front view of FIG. 1, FIG. 3 is a cross-sectional view taken along line A-A of FIG. 2, and FIG. 4 is an enlarged view illustrating features of FIG. 3;

First, specific components of the present embodiment include a reservoir 200 which is integrally formed with a motor housing 110 or is formed to be separate from and attached to the motor housing 110, and a nozzle plate 300 which is installed in a space of the reservoir 200 and includes a plurality of nozzles 320 configured to spray a cooling liquid (cooling water or cooling oil), with an optimized spray form, onto a stator core 120 and coil 130 which are heating portions in the motor 100.

The present embodiment will be more specifically described below.

The reservoir 200 is filled with a cooling liquid, such as cooling oil or cooling water, and the cooling liquid is directly sprayed onto a heating portion (for example, the core 120 and the coil 130) in the motor 100 through the nozzles 320 of the nozzle plate 300. The cooling liquid passes through a cooling path (which will be described below with reference to FIGS. 7 and 8) formed between the motor housing 110 and the core 120 or the coil 130 in the motor housing 110, is collected, and is again provided to the reservoir 200 through an inlet 210 to circulate. Accordingly, from this viewpoint, the reservoir 200 serves as a damper configured to maintain a pressure of the cooling liquid to be constant.

The reservoir 200 is integrally formed with the motor housing 110 when the motor housing 110 is formed, or is manufactured to be separate from and coupled to the motor housing 110 through a welding process or using a unit such as a bolt. The reservoir 200 is substantially formed to have a shape of a space which is filled with the cooling liquid, and through-holes 140 communicating with the core 120 which is a heating portion in the motor 100 are formed in a bottom surface in the reservoir 200. Accordingly, through-holes corresponding to the through-holes 140 should also be formed at a corresponding position in the motor housing 110. In a case in which the reservoir 200 is integrally formed with the motor housing 110, the through-holes 140 of the reservoir 200 may alternatively be formed to simultaneously serve as the through-holes of the motor housing 110.

The nozzle plate 300 is formed in the reservoir 200 such that the nozzles 320 are inserted into the through-holes 140 (see FIGS. 3 and 4). The nozzle plate 300 may be bolt-installed by inserting bolts into a plurality of coupling holes formed in the bottom surface of the reservoir 200 through a plurality of bolt holes formed in the nozzle plate 300. However, the present invention is not limited thereto.

Last, a reservoir cover 400 is coupled to an upper portion of the reservoir 200. The cover 400 may be bolt-coupled by inserting bolts into a plurality of coupling holes formed in an upper surface of the reservoir 200 through a plurality of bolt holes 410 formed in the cover 400. However, instead of such a bolting method, a one-touch type snap coupling method may also be applicable for the sake of convenience in maintenance. A gasket or sealer may be used between the cover 400 and the reservoir 200 to provide a sealing function to the cover 400 so as to maintain sealing of the cooling liquid.

In this configuration, a circulation path and an operating mechanism of the cooling liquid will be described below. First, the cooling liquid in the motor housing 110 is moved by a pumping mechanism and is introduced into a tank of the reservoir 200 through the inlet 210. The reservoir 200 serves as a damper so that a pressure of the cooling liquid is constantly maintained. Accordingly, a pressure in the tank of the reservoir 200 is increased, and thus the cooling liquid is directly sprayed onto, for example, the coil 130 and the core 120 which are heating portions in the motor 100, through the nozzles 320 of the nozzle plate 300.

An advantage of such a direct spray is that the low temperature cooling liquid is directly provided to the heating portion so that cooling efficiency is improved. In addition, conventionally a cooling liquid is only sprayed around a heating portion through a hole of a cooling pipe used for the conventional cooling method, but, according to the present invention, the cooling liquid can be directly sprayed onto the heating portion (core, coil, and the like). In addition, since the conventional cooling pipe is omitted, a structural margin is obtained in the motor 100 so that the stator core 120 can be assembled to the motor housing 110 through a direct press-fitting. Accordingly, since an effect in which the core and the coil are further cooled due to heat conduction of a temperature outside the motor is also obtained, cooling efficiency is improved. In addition, a conventionally used flange for fixing the motor housing 110 and the core 120 is removed and thus a portion which hinders movement of the cooling liquid is removed and bolts for the flange are also removed.

Figure 5:
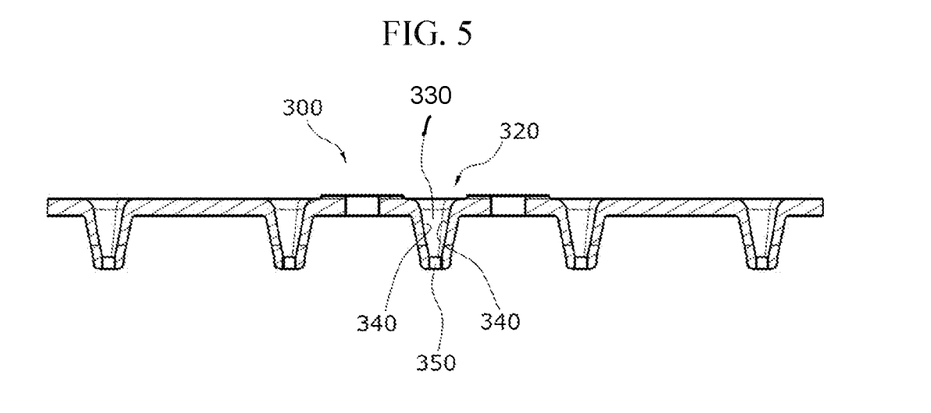
FIG. 5 is a cross-sectional view of a nozzle plate (300)

FIG. 5 is a cross-sectional view of the nozzle plate 300 for describing a region of the nozzles 320. The region will be described with reference to FIGS. 4 and 5.

The nozzles 320 formed in the nozzle plate 300, as illustrated in FIG. 4, protrude downward to be inserted into the through-holes 140 formed in the bottom surface of the reservoir 200 or the motor housing 110. The nozzles 320 include cooling liquid entrances 330, cooling liquid spray holes 350, and spray path inner walls 340 which connect the cooling liquid entrances 330 and the cooling liquid spray hole 350 which have different diameters, like any nozzle.

Figure 6A:
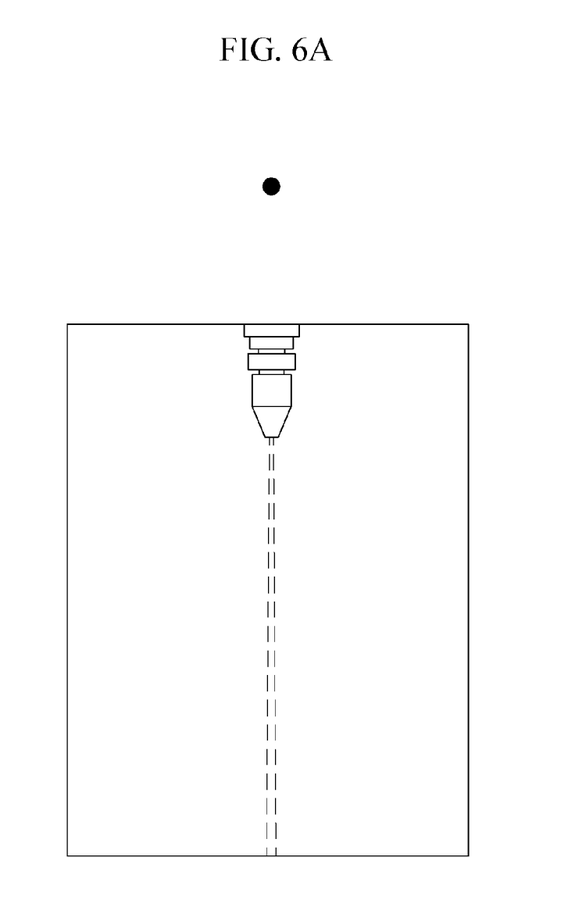
FIGS. 6A-6C are views illustrating examples of spraying shapes of a cooling liquid according to nozzle structures.
Figure 6B:
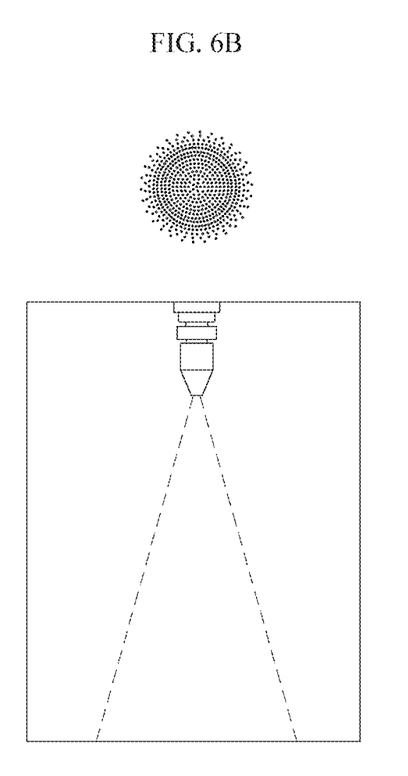
Figure 6C:
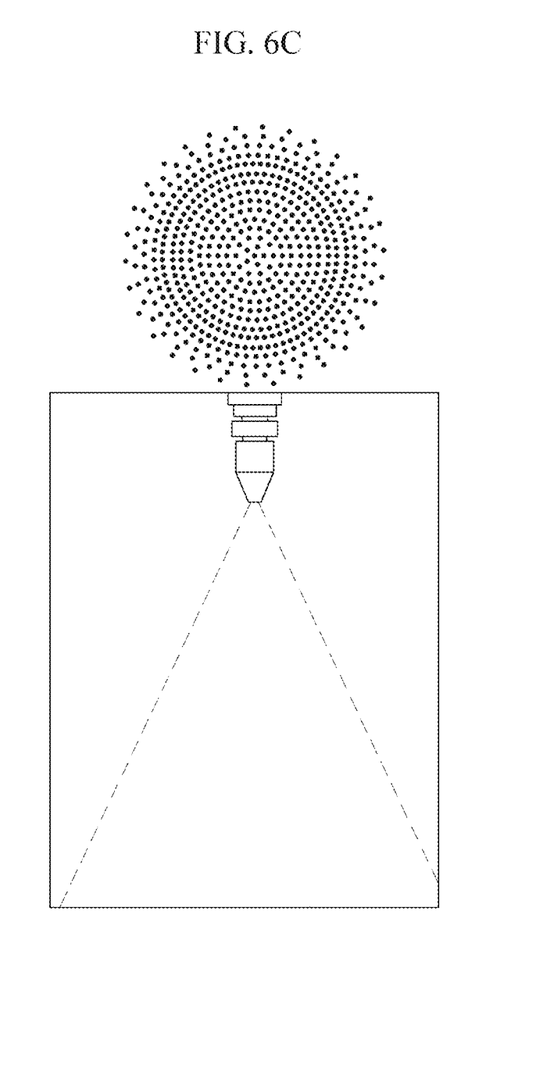

A spraying shape of the cooling liquid sprayed by each of the nozzles 320 may be freely designed by adjusting a shape and a cross section of one of the entrances 330 and one of the spray holes 350 and a shape of one of the spray path inner walls 340. For example, FIGS. 6A-6C are views illustrating various examples of spraying shapes formed according to different structures of the nozzle 320. By designing the structure of the nozzle 320 to form a desired cooling liquid spraying shape, a spraying angle or sizes of sprayed particles of the cooling liquid can be optimized according to the heating portion in the motor 100. By providing various kinds of the nozzle plate 300 to which nozzle structures having various spraying shapes are applied, when the cooling target motor 100 is manufactured, the nozzle plate 300 corresponding to a kind of each motor is applied, and thus cooling performance can be optimized according to a kind and an output of each motor.

By applying the nozzles 320 to the nozzle plate 300 as described above, a phenomenon of the cooling liquid running down due to a decrease in pressure which can occur in a hole of the conventional cooling pipe does not occur and so cooling performance can be improved. Also, since a design of the structure of the nozzle 320 becomes free, a structure such as a cross sectional area, a shape of a cross section and the like of the nozzle 320 can be changed according to each heating portion of the motor 100, and thus the cooling liquid having an optimized spraying shape can be supplied.

Figure 7:
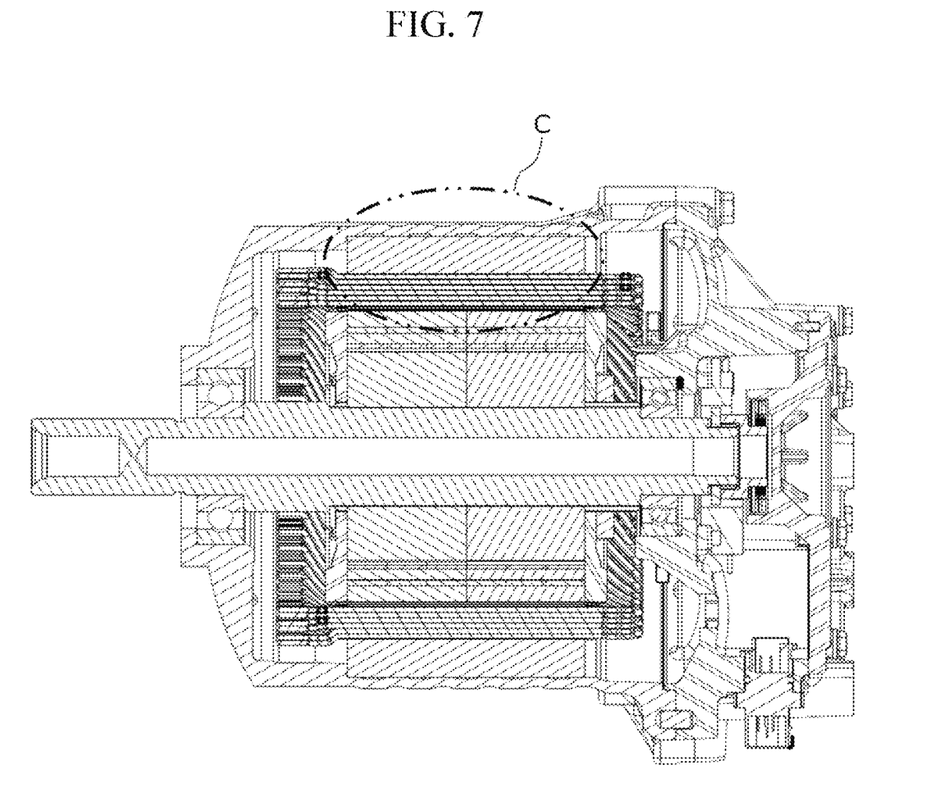
FIG. 7 is a cross-sectional view taken along line B-B of FIG. 2.
Figure 8:
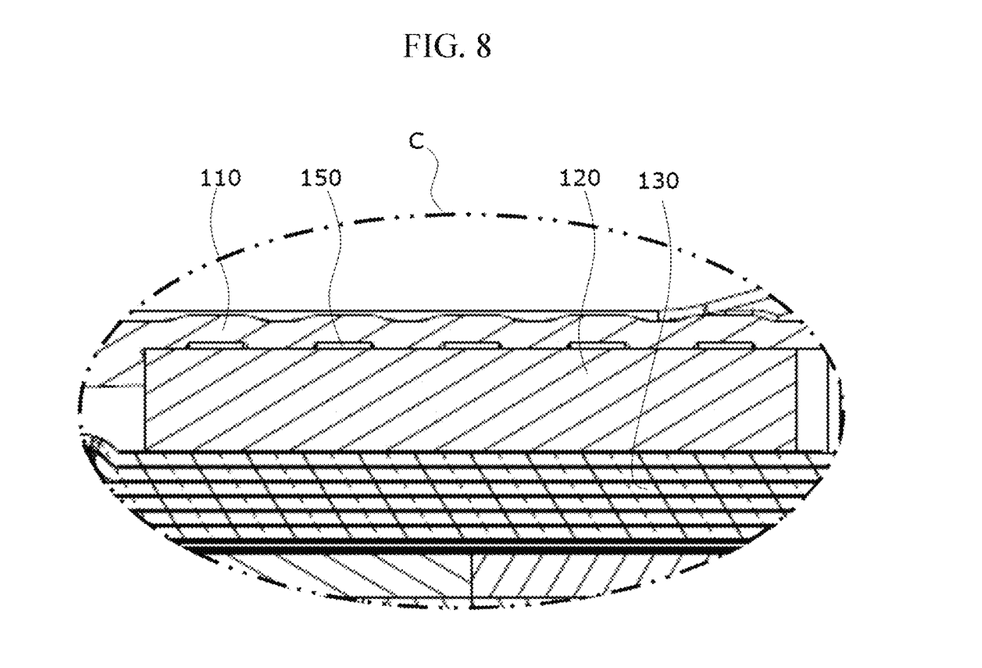
FIG. 8 is an enlarged view illustrating portion C of FIG. 7.

FIG. 7 is a cross-sectional view taken along line B-B of FIG. 2, and FIG. 8 is an enlarged view illustrating portion C of FIG. 7.

Flow paths 150 through which the cooling liquid flows are formed in addition to the motor housing 110 and surfaces to be in contact with the stator core 120 in the motor housing 110. A starting point of the flow paths 150 is the reservoir 200 and an end point thereof is the reservoir inlet 210. By adding the flow paths 150 as described above, the cooling liquid, which is directly sprayed onto the heating portion (in the case of the present embodiment, core 120 and coil 130) in the motor housing 110 through the nozzles 320 from the reservoir 200, circulates through the flow paths 150, enters the reservoir 200 again through the reservoir inlet 210, and is sprayed again due to an inner pressure damping action of the reservoir 200 and uniform pressures of all the nozzles. A pump (not shown) may be used for such a recirculation action of the cooling liquid. In addition, a flow rate, a pressure, a spray time, etc. of the cooling liquid sprayed onto the heating portion using the pump and through a recirculating path of the cooling liquid may be variously and intelligently controlled using an artificial intelligence and a learning algorithm according to output specifications of various motors 100 to obtain optimized performance for each motor and each car.

Modified Embodiment

As a modified embodiment of the above described embodiment, the above described nozzle plate 300 may be removed, and instead nozzles for spraying a cooling liquid may also be formed in a motor housing 110 or a reservoir 200.

In the case of the former, that is, in the case in which the nozzles for spraying the cooling liquid are formed in the motor housing 110, through-holes or corresponding parts should be formed at positions, which correspond to the nozzles formed in the motor housing 110, of the reservoir 200 which is integrally formed with the motor housing 110 or which is formed to be separate from and attached to the motor housing 110.

On the other hand, in the case of the latter, that is, in the case in which the nozzles for spraying the cooling liquid are formed in the reservoir 200, through-holes communicating with a heating portion in the motor should be formed in the motor housing 110, and the nozzles of the reservoir 200 should be inserted into the through-holes.

It will be understood that the other components and a cooling action are the same as those of the previously described basic embodiment.

According to the present invention, the following effects can be obtained.

1. Since a reservoir space is provided in a motor housing and a plate having nozzles is provided instead of a high cost oil cooling pipe, a structure is simplified and a cost is reduced.

2. Since a conventional method of providing oil to a heating portion through cooling pipe holes is modified and a cooling liquid is directly sprayed onto a heating portion through the nozzles, cooling performance can be improved.

3. In the case of a conventional direct oil cooling method, since a space is required between a housing and a stator core due to a cooling pipe, the stator core cannot be press-fitted into the housing. According to the present invention, since the cooling pipe is removed, the stator can be press-fitted into the motor housing. Accordingly, since adherency between cooling target components is improved, a cooling effect due to a temperature outside the housing is added to improve a cooling effect. In addition, even with a press-fit structure, since a flow path surrounding the core is formed, oil capable of cooling the core can be provided, and thus, core cooling performance is also improved.

4. According to a conventional technology, a core flange is formed on a core to fix the core to a housing, and the core flange is assembled to the housing using a bolt. The flange hinders movement of oil provided through a cooling pipe. According to the present invention, since the core is press-fitted into the housing, a disadvantage of the conventional technology is overcome.

5. The core flange fixing bolt for fixing the core to the housing is removed (reduction of the number of components).

6. In a conventional cooling pipe, a phenomenon may occur in which, when oil runs down through a flow path, the oil is sequentially sprayed through holes, pressures of the rear spray holes are decreased, and thus the oil may remain in the holes or run down along a structure. However, according to the present invention, the phenomenon in which the cooling liquid runs down an unnecessary portion along a structure does not occur, because the cooling liquid is sprayed due to a pressure from the nozzles and a shape of end portions of the nozzles can be designed as a nipple shape, and therefore cooling performance is improved.

7. While there is no choice but to form the hole of the conventional cooling pipe as a simple hole shape due to a machining reason, a degree of freedom of a cross section of the nozzle according to the present invention is high. Thus, the cooling liquid can be supplied to the heating portion in an optimized injection or spraying shape.

8. Since a flow rate and a spray time of the cooling liquid can be intelligently controlled according to a type and output power specification of a motor, cooling performance optimized to the output of the motor can be achieved.

Although the structure of present invention has been described in detail with reference to the exemplary embodiments thereof, it will be understood by those skilled in the art that the invention may be performed in other concrete forms without changing the technological scope and essential features. The above-described embodiments should be considered in descriptive senses only and not for purposes of limitation. The scope of the present invention is defined not by the detailed description but by the appended claims. All modifications and equivalents that fall within the scope of the appended claims will be construed as being included in the present invention.

What is claimed is:

1. A car motor cooling apparatus comprising:
   a motor housing in which a through-hole exposing a heating portion in a motor and a cooling path through which a cooling liquid flows along a stator via the through-hole are formed;
   a reservoir connected to the motor housing and having an inner space to be filled with the cooling liquid; and
   a nozzle plate installed in the inner space of the reservoir and including a nozzle configured to spray the cooling liquid directly onto the heating portion in the motor through the through-hole of the motor housing.

2. The car motor cooling apparatus of claim 1, wherein the reservoir is integrally formed with the motor housing.

3. The car motor cooling apparatus of claim 1, wherein the reservoir is formed to be separate from and attached to the motor housing.

4. The car motor cooling apparatus of claim 1, wherein the reservoir includes a reservoir cover which maintains air-sealing of the cooling liquid in the reservoir.

5. The car motor cooling apparatus of claim 1, wherein:
   the reservoir includes a reservoir inlet through which the cooling liquid is introduced into the reservoir; and
   the cooling liquid flows from the reservoir to the heating portion in the motor housing through the nozzle of the nozzle plate, circulates through the cooling path, and enters the reservoir through the reservoir inlet.

6. The car motor cooling apparatus of claim 1, further comprising a processor configured to differently control at least one among a flow rate, a pressure, and a spray time of the cooling liquid to be sprayed onto the heating portion through the nozzle according to output power specification of the motor.

7. The car motor cooling apparatus of claim 1, wherein the nozzle is configured to spray the cooling liquid directly onto the heating portion in the motor.

8. A car motor cooling apparatus comprising:
   a motor housing including a nozzle configured to spray a cooling liquid directly onto a heat generating portion of a motor; and
   a reservoir connected to the motor housing and having an inner portion filled with the cooling liquid.

9. The car motor cooling apparatus of claim 8, wherein the reservoir is integrally formed with the motor housing.

10. The car motor cooling apparatus of claim 8, wherein the reservoir is formed to be separate from and attached to the motor housing.

11. The car motor cooling apparatus of claim 8, wherein the reservoir includes a reservoir cover configured to maintain sealing of the cooling liquid in the reservoir.

12. The car motor cooling apparatus of claim 8, wherein:
   the reservoir includes a reservoir inlet through which the cooling liquid is introduced into the reservoir; and the motor housing includes a cooling path through which the cooling liquid passes,
   wherein the cooling liquid flows from the reservoir to the heat generating portion in the motor housing through the nozzle of the motor housing, circulates through the cooling path, and enters the reservoir through the reservoir inlet.

13. The car motor cooling apparatus of claim 8, further comprising a processor configured to differently control at least one among a flow rate, a pressure, and a spray time of the cooling liquid to be sprayed onto the heat generating portion through the nozzle according to output power specification of the motor.

14. The car motor cooling apparatus of claim 8, wherein the nozzle is configured to spray the cooling liquid directly onto the heat generating portion in the motor.

15. A car motor cooling apparatus comprising:
   a motor housing in which a through-hole exposing a heat generating portion of a motor is formed; and
   a reservoir which is connected to the motor housing and includes a nozzle, which sprays a cooling liquid directly onto the heat generating portion in the motor through the through-hole of the motor housing, and an inner space to be filled with a cooling liquid.

16. The car motor cooling apparatus of claim 15, wherein the reservoir is integrally formed with the motor housing.

17. The car motor cooling apparatus of claim 15, wherein the reservoir is formed to be separate from and attached to the motor housing.

18. The car motor cooling apparatus of claim 15, wherein the reservoir includes a reservoir cover configured to maintain sealing of the cooling liquid.

19. The car motor cooling apparatus of claim 15, wherein:
   the reservoir includes a reservoir inlet through which the cooling liquid is introduced into the reservoir; and
   the motor housing includes a cooling path through which the cooling liquid passes,
   wherein the cooling liquid circulates through the nozzle of the reservoir, the heat generating portion in the motor housing, and the cooling path and enters the reservoir through the reservoir inlet.

20. The car motor cooling apparatus of claim 15, further comprising a processor configured to differently control at least one among a flow rate, a pressure, and a spray time of the cooling liquid to be sprayed onto the heat generating portion through the nozzle according to output power specification of the motor.

21. The car motor cooling apparatus of claim 15, wherein the nozzle is configured to spray the cooling liquid directly onto the heat generating portion in the motor.

* * * * *